3,816,626
3-PYRIDYL - 1,2,4 - BENZOTHIADIAZINE-1,1-DI-
OXIDE FOR LOWERING URIC ACID LEVELS
Frederick C. Novello, Berwyn, Pa., assignor to Merck &
Co., Inc., Rahway, N.J.
No Drawing. Filed June 29, 1972, Ser. No. 267,278
Int. Cl. A61k 27/00
U.S. Cl. 424—246                15 Claims

ABSTRACT OF THE DISCLOSURE

Method for decreasing the concentration of uric acid in the blood and urine of a mammal by the administration of a 3-pyridyl-1,2,4-benzothiadiazine-1,1-dioxide product or a 3,4-dihydro derivative. Products employed in this method of treatment are prepared by conventional procedures employing ring closure of the appropriate orthanilamide. The products effect the lowering of the uric acid level by virtue of their xanthine oxidase inhibiting properties.

---

This invention is concerned with a method of lowering the uric acid level in the blood and urine of a mammal by the administration of a benzothiadiazine compound having a 3-pyridyl substituent, which products have been found to exhibit marked xanthine oxidase inhibiting properties comparable to or greater than that exhibited by allopurinol when all compounds are evaluated in the same in vitro test.

The products employed in the method of this invention have the structural Formula I or II

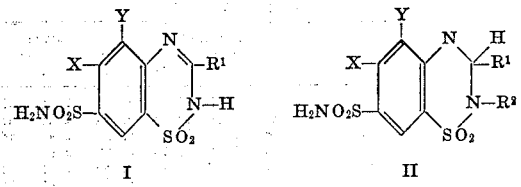

and pharmacologically acceptable salts thereof wherein X is selected from halogen, particularly chloro or bromo, trifluoromethyl and $C_{1-3}$ alkyl; Y represents hydrogen, chloro and $C_{1-3}$ alkyl; $R^1$ represents pyridyl, its quaternary ammonium salt or N-oxide, and mono- or di-substituted pyridyl wherein the substituents can be the same or different groups selected from hydroxy, $C_{1-3}$ alkyl, $C_{1-3}$ alkoxy, amino and acetylamino; and $R^2$ is $C_{1-3}$ alkyl, preferably methyl.

The active products can be prepared by one or another of the well known procedures for making benzothiadiazine compounds of structures I and II.

In general, the benzothiadiazine compounds of structure I can be prepared by reacting a mixture of the appropriate orthanilamide derivative with the pyridine carboxylic acid halide which, for practical purposes, can be the acid chloride. The acid chloride can be preformed and employed in the reaction or it can be prepared in situ by the addition of phosphorus oxychloride to a mixture of the orthanilamide and the pyridine carboxylic acid. When the acid chloride is preformed, the reaction advantageously is conducted in the presence of an inert solvent such as dioxane, tetrahydrofuran, dimethylformamide, and the like and is facilitated by heating up to the reflux temperature of the reaction mixture. When the pyridine carboxylic acid chloride is formed in situ, the phosphorus oxychloride serves not only to form the acid chloride but as solvent as well.

A conventional method for preparing the 3,4-dihydrobenzothiadiazine of structure II above comprises reacting a mixture of the appropriate orthanilamide derivative with the pyridine carboxaldehyde, generally in the presence of a mineral acid. In those instances where a substituent is attached to either the pyridyl moiety or the orthanilamide moiety that would be removed under acid conditions the reaction can take place in the presence of base such as an alkali metal hydroxide or the reaction time in the presence of a mineral acid can be closely followed to determine the point at which cyclization is effected. When acid labile groups are present the reaction generally is conducted at ambient temperature in the presence of mineral acid. When an alkali metal hydroxide is employed or when no acid labile groups are present the reaction mixture can be heated up to reflux conditions. It is well known that the 3,4-dihydro compounds (II) can be prepared from the dehydro compounds (I) by reduction employing hydrogen in the presence of ruthenium or by treatment with an alkali metal borohydride or an equivalent reducing agent capable of reducing the double bond. Various methods of reducing the double bond have been described in the literature and any one of these methods can be employed in converting the products of structure I to the products of structure II.

Pharmacologically acceptable salts generally are the alkali metal salts which may be prepared by conventional methods, for example by treatment with an alkali metal hydroxide, e.g. sodium or potassium hydroxide, in a solvent such as a lower alkanol or in water and evaporating the solvent or by reacting the free compound, for example, in an ether, e.g. dioxane or diethyleneglycol dimethyl ether solution with an alkali metal hydride or amide and removing the solvent. Mono- or poly-salts may be obtained.

As the active products of the method of this invention are inhibitors of xanthine oxidase, they effectively decrease the concentration of uric acid in the blood and urine of mammals, and additionally increase the excretion of hypoxanthine and xanthine. The method of this invention therefore is particularly useful in the treatment and management of gout preferably by oral administration of from about 100 to 800 mg. per day of the active products in divided doses as prescribed by the physician.

Any of the known methods for formulating thiazide products can be used in the preparation of suitable dosage forms of the active ingredients employed in the method of this invention. The following formulation is therefore provided to illustrate one of many suitable dosage forms:

DRY-FILLED CAPSULES CONTAINING 100 MG. OF
ACTIVE INGREDIENT PER CAPSULE

Per capsule, mg.
3-(4-pyridyl) - 6 - trifluoromethyl - 7 - sulfamoyl-
  1,2,4-benzothiadiazine-1,1-dioxide _____ 100.0
Lactose _____ 175.0
Magnesium stearate _____ 0.5
Capsule size No. 2.

3

The active ingredient is reduced to a No. 60 powder. The lactose then is also reduced to a No. 60 powder by passing through a No. 60 bolting cloth. The ingredients are combined, admixed for 10 minutes and filled into the No. 2 capsules.

The following examples illustrate methods employed to prepare the active ingredients employed in the method of this invention.

EXAMPLE 1

3-(4-pyridyl-1-methyl chloride)-6-chloro-7-sulfamoyl-1,2,4-benzothiadiazine-1,1-dioxide A solution of 6-chloro-3-(4-pyridyl)-7-sulfamoyl-1,2,4-benzothiadiazine-1,1-dioxide (0.5 g., 0.00134 mole) in dimethylformamide (4 ml.) is treated with methyl iodide (2.0 g., 0.0142 mole) and stirred at ambient temperature for 48 hours. Following precipitation with ether and purification by reprecipitation from sodium hydroxide solution with hydrochloric acid, the product melts at >350° C.

Analysis.—Calculated for $C_{13}H_{12}Cl_2N_4O_4S_2$: C, 36.89; H, 2.86; N, 13.24. Found: C, 37.15; H, 2.95; N, 13.24.

EXAMPLE 2

3-(2-amino-4-pyridyl)-6-chloro-7-sulfamoyl-1,2,4-benzothiadiazine-1,1-dioxide hydrochloride A solution of 6-chloro-3-(2-acetamido-4-pyridyl)-7-sulfamoyl-1,2,4-benzothiadiazine-1,1-dioxide (1.0 g., 0.0023 mole) in 6 N hydrochloric acid (50 ml.) and ethanol (50 ml.) is heated under reflux for 3 hours. The mixture is chilled and the precipitate collected and recrystallized from water giving product melting at 325–328° C.

Analysis.—Calculated for $C_{12}H_{10}ClN_5O_4S_2 \cdot HCl$: C, 33.97; H, 2.61; N, 16.51. Found: C, 34.03; H, 2.71; N, 16.36.

dissolved in a mixture of 75 ml. of ethanol and 75 ml. of concentrated ammonium hydroxide. The solution is heated under reflux for three hours then concentrated to dryness in vacuo, the residue suspended in 100 ml. of water and the product precipitated upon acidification with hydrochloric acid. The product is purified by recrystallization from a mixture of dimethylformamide and water.

By reacting 2,4-disulfamoyl-5-chloroaniline with 4-pyridine carboxylic acid chloride by the procedure described in Method A there is obtained 3-(4-pyridyl)-6-chloro-7-sulfamoyl-1,2,4-benzothiadiazine-1,1-dioxide.

Method B

An intimate mixture of the orthanilamide derivative (0.01 mole) and heterocyclic carboxylic acid (0.01 mole) is heated with 20 ml. of phosphorus oxychloride for 15 minutes at 50° C. and for an additional 45 minutes on the steam bath. The solution is cooled and poured onto ice. The product is separated and then heated on the steam bath in a mixture of 50 ml. of ethanol and 50 ml. of concentrated ammonium hydroxide for two hours. After concentration in vacuo, the residue is treated with 50 ml. of water and the product separated by acidification with hydrochloric acid.

By reacting 2,4-disulfamoyl-5-chloroaniline and 2-methoxy-5-pyridine carboxylic acid according to the procedure described in Method B there is obtained 3-(2-methoxy-5-pyridyl)-6-chloro - 7 - sulfamoyl-1,2,4-benzothiadiazine-1,1-dioxide.

The products of Table I were prepared by the procedure of Method A or Method B as indicated in the table employing the orthanilamide and the heterocyclic carboxylic acid or acid halide having the substituents designated in the table. The substituents X, R, R¹ and R² of the starting materials appear unchanged in the end product, I.

TABLE I

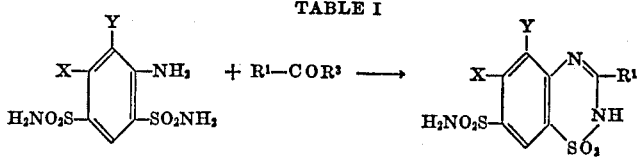

| Ex. No. | X | Y | R¹ | R³ | Meth of syn. | M.P. °C. | Formula | Calculated C | Calculated H | Calculated N | Found C | Found H | Found N |
|---|---|---|---|---|---|---|---|---|---|---|---|---|---|
| 4 | CF₃ | H | 4-pyridyl | Cl | A | 339–342 | $C_{13}H_9F_3N_4O_4S_2$ | 38.42 | 2.23 | 13.79 | 38.36 | 2.66 | 13.56 |
| 5 | Cl | Cl | ---do--- | Cl | A | >350 | $C_{12}H_8Cl_2N_4O_4S_2$ | 35.39 | 1.98 | 13.76 | 35.39 | 2.16 | 13.75 |
| 6 | CH₃ | Cl | ---do--- | Cl | A | >350 | $C_{13}H_{11}ClN_4O_4S_2$ | 40.36 | 2.87 | 14.48 | 40.35 | 2.90 | 14.43 |
| 7 | CH₃ | CH₃ | ---do--- | Cl | A | >350 | $C_{14}H_{14}N_4O_4S_2$ | 45.89 | 3.85 | 15.29 | 45.55 | 3.94 | 15.12 |
| 8 | Cl | CH₃ | ---do--- | Cl | A | >350 | $C_{13}H_{11}ClN_4O_4S_2$ | 40.36 | 2.87 | 14.48 | 40.48 | 3.15 | 14.48 |
| 9 | CH₃ | H | ---do--- | Cl | A | 342 | $C_{13}H_{12}N_4O_4S_2$ | 44.31 | 3.43 | 15.90 | 44.55 | 3.45 | 15.99 |
| 10 | Cl | H | 2-methyl-4-pyridyl | OH | B | >340 | $C_{13}H_{11}ClN_4O_4S_2$ | 40.36 | 2.87 | 14.48 | 40.21 | 2.91 | 14.48 |
| 11 | Cl | H | 2,6-dimethyl-4-pyridyl | OH | B | 361 | $C_{14}H_{13}ClN_4O_4S_2$ | 41.95 | 3.27 | 13.98 | 41.64 | 3.33 | 13.67 |
| 12 | Cl | H | 2-methoxy-6-methyl-4-pyridyl | OH | B | >360 | $C_{14}H_{13}ClN_4O_5S_2$ | 40.34 | 3.14 | 13.44 | 40.83 | 3.11 | 13.43 |
| 13 | Cl | H | 2-acetamido-4-pyridyl | OH | B | 255–258 | $C_{14}H_{13}ClN_5O_5S_2 \cdot H_2O$ | 37.54 | 3.15 | 15.64 | 37.55 | 3.05 | 15.68 |
| 14 | Cl | H | 2,6-dihydroxy-4-pyridyl | OH | B | >350 | $C_{12}H_9ClN_4O_6S_2$ | 35.60 | 2.24 | 13.84 | 35.73 | 2.38 | 13.85 |

EXAMPLE 3

3-(4-pyridyl-1-oxide)-6-chloro-7-sulfamoyl-1,2,4-benzothiadiazine-1,1-dioxide

A solution of 6-chloro-3-(4-pyridyl)-1,2,4-benzothiadiazine-1,1-dioxide (1.3 g.) in dimethylformamide (20 ml.) and 40% peracetic acid (1 ml.) is heated on the steam bath for 18 hours, cooled and diluted with water (200 ml.). Following recrystallization from dimethylformamide-water the product melts at 308–310° C.

Analysis.—Calculated for $C_{12}H_9ClN_4O_5S_2$: C, 37.07; H, 2.33; N, 14.41. Found: C, 37.19; H, 2.52; N, 14.22.

The following methods were employed in preparing the products of Table I:

Method A

A mixture of the orthanilamide derivative (0.02 mole) and pyridine carboxylic acid chloride (0.022 mole) in 75 ml. of dioxane or other inert organic solvent is heated under reflux conditions for about 24 hours. The mixture is chilled, the solid collected, washed with cold ether and

EXAMPLE 15

2-methyl-3-(2-methoxy-5-pyridyl)-6-chloro-7-sulfamoyl-3,4-dihydro-1,2,4-benzothiadiazine-1,1-dioxide A solution of 2-N-methylsulfamoyl - 4-sulfamoyl-5-chloroaniline (0.01 mole) and 2-methoxy-5-pyridine carboxaldehyde (0.02 mole) in ethanol (20 ml.) and 6 N hydrochloric acid (20 ml.) is stirred at ambient temperature for one hour. The solid is collected and recrystallized from a mixture of dimethylformamide and water to give the product melting at 224–227° C.

Analysis.—Calculated for $C_{14}H_{15}ClN_4O_5S_2$: C, 40.14; H, 3.61; N, 13.38. Found: C, 39,73; H, 3.99; N, 13.24.

EXAMPLE 16

2-methyl-3-(4-pyridyl)-6-chloro-7-sulfamoyl-3,4-dihydro-1,2,4-benzothiadiazine-1,1-dioxide By replacing the 2-methoxy-5-pyridine carboxaldehyde employed in Example 15 by an equivalent quantity of 4-pyridine carboxaldehyde and following substantially the same procedure described in Example 15, crude product is obtained which following recrystallization from a mixture of dimethylformamide and water, melts at 215–216° C.

Analysis.—Calculated for $C_{13}H_{13}ClN_4O_4S_2$: C, 41,21; H, 3.46; N, 14.78. Found: C, 40.90; H, 3.65; N, 14.54.

By replacing the orthanilamide and the pyridine carboxaldehyde employed in Example 15 by equivalent quantities of the following reaction pairs:

(a) 2-N-methylsulfamoyl-4-sulfamoyl-5-trifluoromethylaniline and 2-pyridyl carboxaldehyde,
(b) 2-N-methylsulfamoyl-4-sulfamoyl-5-trifluoromethylaniline and 3-pyridyl carboxaldehyde,
(c) 2-N-methylsulfamoyl-4-sulfamoyl-5-bromoaniline and 3-methyl-2-pyridyl carboxaldehyde, and
(d) 2-N-methylsulfamoyl-4-sulfamoyl-5-methylaniline and 4-pyridyl carboxaldehyde, there is obtained, respectively:

EXAMPLE 17

2-methyl-3-(2-pyridyl)-6-trifluoromethyl-7-sulfamoyl-3,4-dihydro-1,2,4-benzothiadiazine-1,1-dioxide.

EXAMPLE 18

2-methyl-3-(3-pyridyl)-6-trifluoromethyl-7-sulfamoyl-3,4-dihydro-1,2,4-benzothiadiazine-1,1-dioxide.

EXAMPLE 19

2-methyl-3-(3-methyl-2-pyridyl)-6-bromo-7-sulfamoyl-3,4-dihydro-1,2,4-benzothiadiazine-1,1-dioxide.

EXAMPLE 20

2-methyl-3-(4-pyridyl)-6-methyl-7-sulfamol-3,4-dihydro-1,2,4-benzothiadiazine-1,1-dioxide.

Representative 3-pyridyl-benzothiadiazines were found to be effective when tested by an art recognized procedure designed to evaluate xanthine oxidase inhibiting properties of compounds. The procedure used employed the principles described in P. Pharm. Sci. 56:995 (1967), Baker et al., and was carried out in the following manner:

A reference cuvette is filled with 0.05 M pH 7.4 buffer. For the control, mix quickly in a cuvette 2 ml. hypoxanthine solution ($6 \times 10^{-5}$ M), 2 ml. 0.05 M pH 7.4 buffer solution, and 2 ml. xanthine oxidase solution, and immediately record the absorbance at 292μ for one minute. For the test solution, add quickly to a separate cuvette 2 ml. hypoxanthine solution ($6 \times 10^{-5}$ M), 2 ml. test solution, and 2 ml. oxidase solution, and immediately record the absorbance at 292μ for one minute. If the inhibition is less than 100%, the percent inhibition is calculated as follows:

$$\frac{\Delta A \text{ control} - \Delta A \text{ test}}{\Delta A \text{ control}} \times 100$$

where ΔA is the change in absorbance in one minute. If the inhibition is 100%, the test solution is serially diluted to determine the concentration required for 50% inhibition.

The percent inhibition effected by certain representative products employed in the method of this invention is provided in the following table. The concentration of the test compound was $2 \times 10^{-5}$ M unless otherwise noted. For comparison $3.2 \times 10^{-6}$ M of allopurinol, a known xanthine oxidase inhibiting agent, effects 50% inhibition of xanthine oxidase by this protocol.

TABLE II

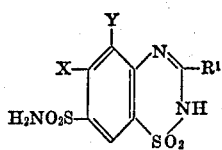

| X | Y | R¹ | Percent inhibition |
|---|---|---|---|
| Cl | H | 4-pyridyl-1-methyl chloride | 31 |
| Cl | H | 2-amino-4-pyridyl | ᵃ 50 |
| Cl | H | 4-pyridyl-1-oxide | 50 |
| CF₃ | H | 4-pyridyl | ᵇ 42 |
| Cl | Cl | do | 59 |
| CH₃ | Cl | do | 40 |
| CH₃ | CH₃ | do | 48 |
| Cl | CH₃ | do | 73 |
| CH₃ | H | do | ᵃ 65 |
| Cl | H | 2-methyl-4-pyridyl | ᵃ 84 |
| Cl | H | 2,6-dimethyl-4-pyridyl | 31 |
| Cl | H | 2-methoxy-6-methyl-4-pyridyl | ᵃ 50 |
| Cl | H | 2-acetamido-4-pyridyl | 70 |
| Cl | H | 2,6-dihydroxy-4-pyridyl | 50 |

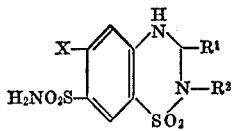

| X | R² | R¹ | Percent inhibition |
|---|---|---|---|
| Cl | CH₃ | 2-methoxy-5-pyridyl | ᵃ 50 |
| Cl | CH₃ | 4-pyridyl | 30 |

Note.—Concentration of test compound: ᵃ $2 \times 10^{-6}$ M; ᵇ $2 \times 10^{-5}$ M.

What is claimed is:

1. A method which comprises orally administering to a mammal having an elevated blood uric acid level a dose sufficient to lower the blood uric acid level to normal for that species of a xanthine oxidase inhibiting compound having the formula I or formula II: 3-R¹-5-Y-6-X-7-H₂NO₂S-1,2,4-benzothiadiazine-1,1-dioxide (I) or 2-R²-3-R¹-6-X-7-H₂NO₂S-3,4-dihydro-1,2,4 - benzothiadiazine-1,1-dioxide (II) or the sodium or potassium salt thereof wherein X represents chloro, bromo, trifluoromethyl or $C_{1-3}$ alkyl; R¹ represents pyridyl, its lower alkyl halide quaternary ammonium salt, N-oxide or mono- or di-substituted pyridyl wherein the substituents are alike or dissimilar selected from the group consisting of hydroxy, $C_{1-3}$ alkyl, $C_{1-3}$ alkoxy, amino, or acetylamino; and R² is $C_{1-3}$ alkyl, and Y represents hydrogen, chloro and $C_{1-3}$ alkyl.

2. A method as claimed in claim 1 wherein the active agent has structure II.

3. A method as claimed in claim 2 wherein in the active agent X is chloro.

4. A method as claimed in claim 2 wherein in the active agent X is chloro and R² is methyl.

5. A method as claimed in claim 2 wherein the active agent is 2 - methyl-3-(2-methoxy-5-pyridyl)-6-chloro-7-sulfamoyl-3,4-dihydro-1,2,4-benzothiadiazine-1,1-dioxide.

6. A method which comprises orally administering to a mammal having an elevated blood uric acid level a dose sufficient to lower the blood uric acid level to normal for that species of a xanthine oxidase inhibiting compound having the formula 3-R¹-5-Y-6-X-7-H₂NO₂S-1,2,4-benzothiadiazine-1,1-dioxide or the sodium or potassium salt thereof wherein X represents chloro, bromo, trifluoromethyl or $C_{1-3}$ alkyl; R¹ represents pyridyl, its lower alkyl halide quaternary ammonium salt, N-oxide or mono- or di-substituted pyridyl wherein the substituents are alike or dissimilar selected from the group consisting of hydroxy, $C_{1-3}$ alkyl, $C_{1-3}$ alkoxy, amino or acetylamino; and Y represents hydrogen, chloro and $C_{1-3}$ alkyl.

7. A method as claimed in claim 6 wherein in the active product R¹ is 4-pyridyl.

8. A method as claimed in claim 7 wherein in the active product Y is hydrogen.

9. A method as claimed in claim 6 wherein the active product is 3-(4-pyridyl)-6-trifluoromethyl-7-sulfamoyl-1,2,4-benzothiadiazine-1,1-dioxide.

10. A method as claimed in claim 6 wherein the active product is 3-(4-pyridyl)-6-methyl-7-sulfamoyl-1,2,4-benzothiadiazine-1,1-dioxide.

11. A method as claimed in claim 6 wherein in the active product Y represents hydrogen and R¹ is a mono- or di-substituted-4-pyridyl.

12. A method as claimed in claim 11 wherein in the active product X is chloro.

13. A method as claimed in claim 6 wherein the active agent is 3 - (2-amino-4-pyridyl)-6-chloro-7-sulfamoyl-1,2,4-benzothiadiazine-1,1-dioxide.

14. A method as claimed in claim 6 wherein the active agent is 3-(2-methyl-4-pyridyl)-6-chloro-7-sulfamoyl-1,2,4-benzothiadiazine-1,1-dioxide.

15. A method as claimed in claim 6 wherein the active agent is 3 - (2-methoxy-6-methyl-4-pyridyl)-6-chloro-7-sulfamoyl-1,2,4-benzothiadiazine-1,1-dioxide.

No references cited.

STANLEY J. FRIEDMAN, Primary Examiner